United States Patent
Henry et al.

(10) Patent No.: US 12,542,917 B2
(45) Date of Patent: Feb. 3, 2026

(54) METHODS AND DEVICES FOR DECODING AT LEAST PART OF A DATA STREAM, COMPUTER PROGRAM AND ASSOCIATED DATA STREAMS

(71) Applicant: ORANGE, Issy-les-Moulineaux (FR)

(72) Inventors: Félix Henry, Saint-Gregoire (FR); Gordon Clare, Pacé (FR)

(73) Assignee: ORANGE, Issy-les-Moulineaux (FR)

( * ) Notice: Subject to any disclaimer, the term of this patent is extended or adjusted under 35 U.S.C. 154(b) by 0 days.

(21) Appl. No.: 18/570,513

(22) PCT Filed: Jun. 9, 2022

(86) PCT No.: PCT/EP2022/065774
§ 371 (c)(1),
(2) Date: Dec. 14, 2023

(87) PCT Pub. No.: WO2022/263297
PCT Pub. Date: Dec. 22, 2022

(65) Prior Publication Data
US 2024/0267542 A1    Aug. 8, 2024

(30) Foreign Application Priority Data
Jun. 17, 2021  (FR) ........................................ 2106455

(51) Int. Cl.
*H04N 19/189*    (2014.01)
*H04N 19/90*     (2014.01)

(52) U.S. Cl.
CPC ........... *H04N 19/189* (2014.11); *H04N 19/90* (2014.11)

(58) Field of Classification Search
CPC .... H04N 19/189; H04N 19/90; H04N 19/192; H04N 19/46; H04N 19/50; H04N 19/00; H04N 19/70; H03M 7/6005; G06N 3/0455
(Continued)

(56) References Cited

U.S. PATENT DOCUMENTS 11,475,540 B2 *  10/2022  Na ........................ G06T 9/002
11,720,997 B2 *  8/2023   Choi ................... H04N 19/132
                                                           382/156
(Continued)

FOREIGN PATENT DOCUMENTS

EP    3767549 A1    1/2021
WO   2020146007 A1  7/2020

OTHER PUBLICATIONS

International Search Report for PCT/EP2022/065774 mailed Sep. 9, 2022, 10 pages.
(Continued)

*Primary Examiner* — Tung T Vo
(74) *Attorney, Agent, or Firm* — Westman, Champlin & Koehler, P.A.; David D. Brush

(57) ABSTRACT

A part of a data stream includes a plurality of data units respectively associated with a plurality of images and together presenting different images of the plurality of images. The data stream part further includes differential encoding data differentially encoding an artificial neural decoding network relatively to a reference artificial neural decoding network. A method for decoding this data stream part includes the following steps: determining the artificial neural decoding network by decoding the differential coding data; and decoding at least one data unit of the plurality of data units by the determined artificial neural decoding network. Another decoding method, decoding devices, a
(Continued)

computer program and associated data streams are also described.

17 Claims, 3 Drawing Sheets

(58) Field of Classification Search
USPC ..................................................... 375/240.2
See application file for complete search history.

(56) References Cited

U.S. PATENT DOCUMENTS

| | | | |
|---|---|---|---|
| 12,036,036 B2* | 7/2024 | Rezazadegan Tavakoli ............... H04N 19/463 | |
| 2019/0238893 A1* | 8/2019 | Covell .................. H04N 19/13 | |
| 2020/0186796 A1* | 6/2020 | Mukherjee ........... H04N 19/107 | |
| 2020/0186809 A1* | 6/2020 | Mukherjee ............. G06N 3/088 | |
| 2021/0042499 A1* | 2/2021 | Hammad ............. G06F 18/214 | |
| 2021/0159912 A1* | 5/2021 | Wang ................... H04N 19/129 | |
| 2021/0192353 A1* | 6/2021 | Guan ..................... G06N 3/082 | |
| 2021/0211684 A1* | 7/2021 | Andreopoulos ..... H04N 19/176 | |
| 2021/0211733 A1* | 7/2021 | Aksu ....................... G06N 3/105 | |
| 2021/0326710 A1* | 10/2021 | Wang ................... H03M 7/6005 | |
| 2021/0399739 A1* | 12/2021 | Choi ....................... H04N 19/70 | |
| 2022/0094977 A1* | 3/2022 | Kim ........................ G06N 3/048 | |
| 2022/0114414 A1* | 4/2022 | Wang ....................... G06N 3/04 | |
| 2022/0272352 A1* | 8/2022 | Dinh ....................... H04N 19/43 | |
| 2022/0329837 A1* | 10/2022 | Li ........................ H04N 19/157 | |
| 2023/0041187 A1* | 2/2023 | Dinh ........................ G06N 3/08 | |
| 2023/0085554 A1* | 3/2023 | Kim ........................ H04N 19/17 375/240.02 | |
| 2023/0262243 A1* | 8/2023 | Ikonin .................... H04N 19/60 382/239 | |
| 2023/0281755 A1* | 9/2023 | Yang ........................ G06N 3/08 382/100 | |
| 2023/0283790 A1* | 9/2023 | Henry .................... H04N 19/46 375/240.12 | |
| 2023/0283836 A1* | 9/2023 | Henry .................. H04N 19/179 375/240.01 | |
| 2023/0370087 A1* | 11/2023 | Henry .................. H04N 19/136 | |
| 2023/0379506 A1* | 11/2023 | Henry ..................... G06T 9/002 | |
| 2024/0323415 A1* | 9/2024 | Romero Guzman ........ G06T 3/4046 | |

OTHER PUBLICATIONS

Written Opinion of the ISA for PCT/EP2022/065774 mailed Sep. 9, 2022, 12 pages.
Guo Lu et al., "DVC: An End-to-end Deep Video Compression Framework", Apr. 7, 2019, available at: arXiv:1812.00101v3, 10 pages.
Simon Wiedemann et al., "DeepCABAC: Context-adaptive binary arithmetic coding for deep neural network compression", May 15, 2019, available at: arXiv:1905.08318v1, 4 pages.
Simon Wiedemann et al., "Compact and Computationally Efficient Representation of Deep Neural Networks", IEEE Transactions on Neural Networks and Learning Systems, vol. 31, No. 3, Mar. 2020, pp. 772-785.
Werner Bailer (Joanneum Research), "Considerations on CfP for Incremental Neural Network", International Organisation for Standardisation, Coding of Moving Pictures and Audio, Jan. 2020, Brussels, BE, 9 pages.
Unknown author, "Working Draft 3 of Compression of neural networks for multimedia content description and analysis", No. 18992, Feb. 20, 2020, MPEG Meeting, Jan. 13, 2020-Jan. 17, 2020, Brussels, Motion Picture Expert Group OR ISO/IEC/JTC1/SC29/WG11, 38 pages, retrieved from the internet: http://phenix.int-evry.fr/mpeg/doc_end_user/documents/129_Brussels/wg11/w18992.zip w18992_NN_compression_WD3.docx.
English translation of the Written Opinion of the International Searching Authority dated Sep. 9, 2022 for corresponding International Application No. PCT/EP2022/065774, filed Jun. 9, 2022.

* cited by examiner

METHODS AND DEVICES FOR DECODING AT LEAST PART OF A DATA STREAM, COMPUTER PROGRAM AND ASSOCIATED DATA STREAMS

CROSS-REFERENCE RELATED APPLICATIONS

This application is the U.S. national phase of International Application No. PCT/EP2022/065774 filed Jun. 9, 2022, which designated the U.S. and claims priority to FR 2106455 filed Jun. 17, 2021, the entire contents of each of which are hereby incorporated by reference.

TECHNICAL FIELD OF THE INVENTION

The present invention relates to methods and devices for decoding part at least of a data stream, as well as associated computer program and data streams.

STATE OF THE ART

It has been proposed to compress data representative of a video content by means of an artificial neural network. The decoding of the compressed data can then be performed by means of another artificial neural network, as described for example in the article "*DVC: An End-to-end Deep Video Compression Framework*", by Guo Lu et al., 2019 IEEE/CVF Conference on Computer Vision and Pattern Recognition (CVPR), Long Beach, CA, USA, 2019, pp. 10998-11007.

DISCLOSURE OF THE INVENTION

In this context, the present invention proposes a method for decoding a part of a data stream, said data stream part comprising a plurality of data units respectively associated with a plurality of images and representative together of the different images of the plurality of images, said data stream part further comprising differential encoding data differentially encoding a decoding artificial neural network relatively to a reference decoding artificial neural network, the decoding method comprising the following steps:
 determining the decoding artificial neural network by decoding said differential encoding data; and
 decoding at least one data unit of the plurality of data units by means of the determined decoding artificial neural network.

Therefore, the differential encoding data are included into the data stream, and allow determining in a simple way the decoding artificial neural network to be used. This avoids the latency time and computational resources otherwise required for determining the optimum decoding artificial neural network. The use of differential encoding data also allows limiting the amount of data required for encoding this decoding artificial neural network in the data stream.

Other non-limiting and advantageous features of the method according to the invention, taken individually or according to all the technically possible combinations, are the following:
 data characteristic of the reference decoding artificial neural network are stored in a memory of the electronic device implementing the decoding method;
 the data stream comprises an identifier of the reference decoding artificial neural network;
 the data stream comprises data descriptive of the reference decoding artificial neural network;
 said descriptive data are included in said part of the data stream;
 said step of decoding said data unit produces a two-dimensional representation of the image associated with said data unit by decoding said data unit and at least another data unit included in said data stream part;
 the reference decoding artificial neural network is defined by a plurality of first weights;
 the determined decoding artificial neural network is defined by a plurality of second weights;
 said differential encoding data comprise data respectively representing a plurality of differences between a first weight and a second weight;
 data indicative of the reference artificial neural network are contained in a set of parameters relating to said data stream part;
 the differential encoding data are contained in a set of parameters relating to the image associated with said data unit;
 the data stream comprises at least one flag signaling the presence, in part at least of the data stream, of at least another flag signaling the presence of data indicative of another decoding artificial neural network, distinct from the determined decoding artificial neural network;
 the data stream comprises at least one flag signaling the presence of said differential encoding data in said data stream part.

It is also proposed a method for decoding a data stream, in which data of the stream are decoded by means of a first decoding artificial neural network into a two-dimensional representation of an image, characterized in that the data stream comprises at least one flag signaling the presence, in part at least of the data stream, of at least another flag signaling the presence of data indicative of a second decoding artificial neural network, distinct from the first decoding artificial neural network.

Such a flag allows indicating if the decoding artificial neural network will be potentially changed or not during the decoding of said at least one part of the data stream. However, the proposed solution is flexible because it is the other flag that signals the presence or absence of the indicative data.

Such a method may further comprise the following steps when the flag signals the presence of the other flag:
 reading the other flag in the data stream;
 obtaining said indicative data by analyzing the data stream (when the other flag signals the presence of these indicative data);
 determining the second decoding artificial neural network based on said indicative data;
 decoding other data of the stream by means of the second decoding artificial neural network.

When the data stream comprises a plurality of parts, each part comprising a plurality of data units respectively associated with a plurality of images and representative together of the different images of the plurality of images, said flag can signal the presence of at least another flag within a given part among said parts.

The method can then comprise, when said flag signals the presence of the other flag in said given part, the following steps for each data unit included in said given part:
 determining (for example, by reading the above-mentioned other flag) the presence of data defining a decoding artificial neural network and relating to the data unit concerned;

in case of presence of these data, decoding the data of the data unit concerned by means of the artificial neural network defined by these data.

The invention also relates to a device for decoding a part of a data stream, said data stream part comprising a plurality of data units respectively associated with a plurality of images and representative together of the different images of the plurality of images, said data stream part further comprising differential encoding data differentially encoding a decoding artificial neural network relatively to a reference decoding artificial neural network, the decoding device comprising:
- a module for determining the decoding artificial neural network by decoding said differential encoding data; and
- a module for decoding at least one data unit of the plurality of data units by means of the decoding artificial neural network determined by the determination module.

Such a decoding device may comprise a storage unit capable of storing data characteristic of the reference decoding artificial neural network.

The decoding device may also comprise a module for processing data descriptive of the reference decoding artificial neural network included in the data stream.

The decoding module may be configured to produce a two-dimensional representation of the image associated with said data unit by decoding said data unit and at least another data unit included in said data stream part.

The invention also proposes a device for decoding a data stream, comprising a module for decoding data of the data stream by means of a first decoding artificial neural network and into a two-dimensional representation of an image, characterized in that the decoding device comprises a module for detecting a flag signaling the presence, in part at least of the data stream, of at least another flag signaling the presence of data indicative of a second decoding artificial neural network, distinct from the first decoding artificial neural network.

This decoding device may comprise:
- a reading module configured to read, when said flag signals the presence of the other flag, the other flag in the data stream; and/or
- an obtaining module configured to obtain, when the other flag signals the presence of said indicative data, said indicative data by analyzing the data stream; and/or
- a module for determining the second decoding artificial neural network based on said indicative data; and/or
- a configuration module designed to configure the decoding module to decode other data of the stream by means of the second decoding artificial neural network.

The obtaining module is configured to obtain said indicative data by analyzing said given part.

The invention moreover proposes a data stream comprising at least one part comprising a plurality of data units respectively associated with a plurality of images and representative together of the different images of the plurality of images, said part further comprising differential encoding data differentially encoding a decoding artificial neural network relatively to a reference decoding artificial neural network, wherein at least one data unit of the plurality of data units can be decoded using the decoding artificial neural network encoded by said differential encoding data.

The invention also proposes a data stream comprising data that can be decoded by means of a first decoding artificial neural network into a two-dimensional representation of an image, characterized in that the data stream comprises at least one flag signaling the presence, in part at least of the data stream, of at least another flag signaling the presence of data indicative of a second decoding artificial neural network, distinct from the first decoding artificial neural network.

The flag can signal the presence of the other flag in the part of the data stream and/or the part of the data stream can comprise the other flag.

The invention also proposes a computer program comprising instructions executable by a processor and designed to implement a decoding method as described hereinabove when these instructions are executed by the processor.

The invention finally proposes a computer-readable recording medium, on which such a computer program is stored.

Of course, the different features, alternatives and embodiments of the invention can be associated with each other according to various combinations, insofar as they are not mutually incompatible or exclusive.

DETAILED DESCRIPTION OF THE INVENTION

Moreover, various other features of the invention will be apparent from the appended description made with reference to the drawings that illustrate non-limiting embodiments of the invention, and wherein:

FIG. 1 schematically shows an encoding device used within the framework of the invention;

Figure 5:
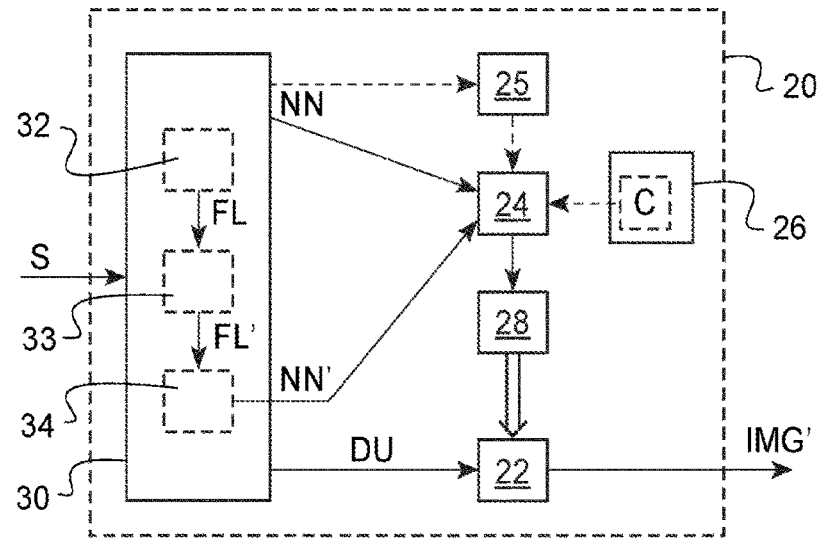

FIG. 5 schematically shows a decoding device according to the invention; and

Figure 6:
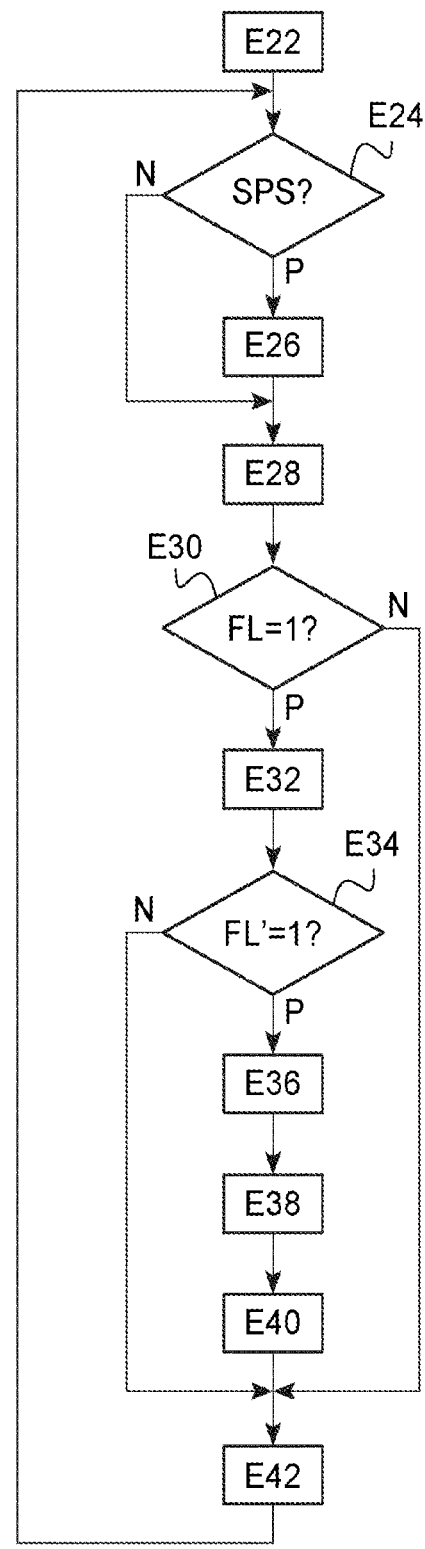

FIG. 6 is a flowchart showing an example of decoding method that can be implemented by the decoding device of FIG. 5.

Figure 1:
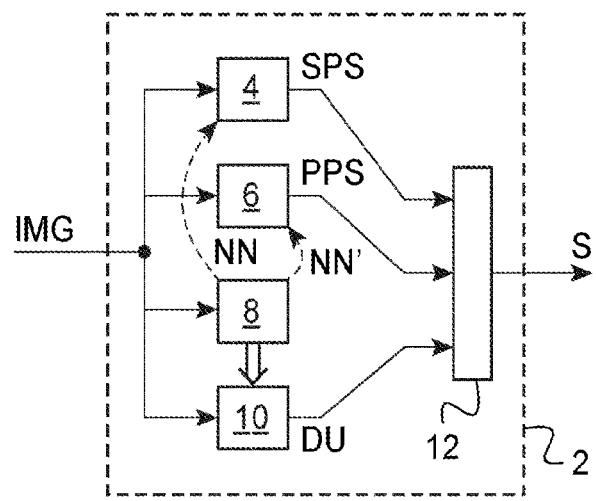

FIG. 1 shows the main functional elements of an encoding device 2.

This encoding device 2 comprises a sequence management module 4, an image management module 6, a network determination module 8, an encoding module 10 and a stream forming module 12.

The encoding device 2 can in practice be implemented by means of an electronic device comprising a processor and a memory; each of the modules 4, 6, 8, 10, 12 mentioned hereinabove can then be made by the cooperation of the processor and of computer program instructions stored in the above-mentioned memory and designed to perform the functions of the relevant module, in particular as described hereinafter, when these instructions are executed by the processor.

The encoding device 2 receives as an input a temporal succession of images IMG to be encoded in order to be stored (for subsequent reading by means of a decoding device) or to be transmitted (to a decoding device).

Each image IMG received as an input is for example represented by means of at least one two-dimensional representation, such as a pixel matrix. In practice, each image IMG received as an input can be represented by a plurality of two-dimensional representations (or pixel matrices) respectively corresponding to a plurality of components of the image (for example a plurality of color components or, as an alternative, a luminance component and at least one chrominance component).

As will be described in greater detail below with reference to FIG. 3, the sequence management module 4 is configured to determine if an image IMG received as an input is a first image of a sequence of images and to determine if an encoding artificial neural network can be updated during this sequence of images. The sequence management module 4 is also configured to produce a set of parameters SPS relating to the current sequence of images.

As described in the following, the encoding device 2 produces in particular as an output a plurality of data units DU respectively associated with a plurality of images IMG of the temporal succession of images. As used here, a "sequence of images" (as defined by the HEVC standard) is a set of images respectively associated with a plurality of such data units DU representative together of the different images of the plurality of images. In other words, any image of a sequence of images can be decoded based on data units DU associated with images of this sequence of images, without reference to other data units associated with images not included in the sequence of images.

As described in more detail hereinafter with reference to FIG. 3, the image management module 6 is configured to determine if the encoding artificial neural network used is updated for encoding the current image IMG. The image management module 6 is moreover configured to produce a set of parameters PPS relating to the current image IMG.

The network determination module 8 is configured to determine an encoding artificial neural network EN to be used for encoding the current image IMG. Various possibilities to perform this determination of the encoding artificial neural network EN to be used are described hereinafter with reference to FIG. 3.

Figure 2:
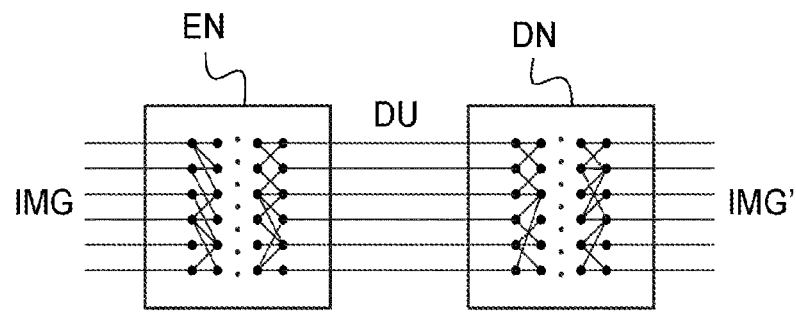
FIG. 2 illustrates an example of a pair of encoding and decoding artificial neural networks.

As illustrated in FIG. 2, the encoding artificial neural network EN used is associated with a decoding artificial neural network DN that can be used to decode the data units DU produced by the encoding artificial neural network EN. The encoding artificial neural network EN and the decoding artificial neural network DN thus form a pair of artificial neural networks.

The encoding artificial neural network EN and the decoding artificial neural network DN are each defined by a structure (comprising for example a plurality of artificial neural layers and/or by a set of weights respectively associated with the artificial neurons of the network concerned).

A representation (for example, two-dimensional) of the current image IMG (or, as an alternative, of a component or a block of the current image IMG) is applied as an input (i.e. on an input layer) of the encoding artificial neural network EN. The encoding artificial neural network EN then produces as an output encoded data, herein a data unit DU.

Subsequently (as described in the following with reference to FIGS. 5 and 6), the encoded data (here, the data unit DU) are applied as an input of the decoding artificial neural network DN. The decoding artificial neural network DN then produces as an output a representation IMG' (for example, two-dimensional) that corresponds to the current image IMG (or, as an alternative, to the relevant component or block of the current image IMG).

The encoding artificial neural network EN is designed in such a way that the data unit DU contains less data (at least on average) than the above-mentioned representation of the current image IMG. In other words, the data of the data unit DU are compressed.

The encoding artificial neural network EN and the decoding artificial neural network DN are moreover previously trained (for example, by applying as an input a great number of images) in such a way as to minimize the differences between the input representation of the current image MG and the output representation IMG' thereof, while also minimizing the amount of data that travel between the encoding artificial neural network EN and the decoding artificial neural network DN.

As described hereinafter, the network determination module 8 can select the encoding artificial neural network EN to be used among several distinct encoding artificial neural networks (respectively belonging to pairs of encoding artificial neural network and decoding artificial neural network).

The network determination module 8 is also configured to produce data NN, NN' indicative of the decoding artificial neural network DN to be used for decoding data units DU (within the decoding device 20 as described hereinafter). As explained hereinabove, this decoding artificial neural network DN (denoted by the above-mentioned indicative data NN, NN') is the decoding artificial neural network of the pair comprising the encoding artificial neural network EN determined (for example, selected) by the network determination module 8. That way, during encoding of the images IMG, the information needed for correctly decoding the data unit DU are contained and transmitted via data NN, NN'. In particular, this avoids the need to determine the optimum decoding artificial neural network and to save decoding time.

The encoding module 10 is configured to encode the representation of the current image IMG (or part of the current image) into encoded data (here, into data units DU) by means of the encoding artificial neural network EN determined by the network determination module 8.

The encoding module 10 thus receives as an input the representation (here two-dimensional, for example a pixel matrix) of the image IMG (or part of the image IMG) and produces as an output a corresponding data unit DU.

As an alternative, the encoding module 10 can receive as an input a representation of a component of the image IMG, or only a block of the image IMG, or also a plurality of images IMG.

According to a possible embodiment, for certain images at least, the encoding module 10 can further receive as an input at least another image representation and/or at least another data unit (associated with another image of the current sequence). The above-mentioned other image representation can be a representation of another image of the current sequence, or, as an alternative, a representation obtained at the output of the decoding artificial neural network DN associated with the encoding artificial neural network EN used by the encoding module 10 when another data unit (associated with another image of the current sequence) is applied as an input of this decoding artificial neural network DN.

The stream forming module 12 is configured to receive as an input the set of parameters SPS relating to the sequence of images, the set of parameters PPS relating to the image IMG, the data NN, NN' indicative of the decoding artificial neural network and the data units DU, and to construct a data stream S based on these elements.

In practice, the stream forming module 12 can comprise a concatenation unit to aggregate (in a predefined manner) the data listed in the preceding paragraph, and an entropy encoder for entropy encoding the aggregated data. However, for the sake of simplification, the entropy encoding step will not be described here and the data stream S will be described as it is before entropy encoding.

The data stream S can then be sent to another electronic device (for example, a decoding device 20 as described hereinafter with reference to FIG. 5, or stored within a memory unit (such as a hard disk drive or the above-mentioned memory of the encoding device 2) for subsequent reading and decoding.

Figure 3:
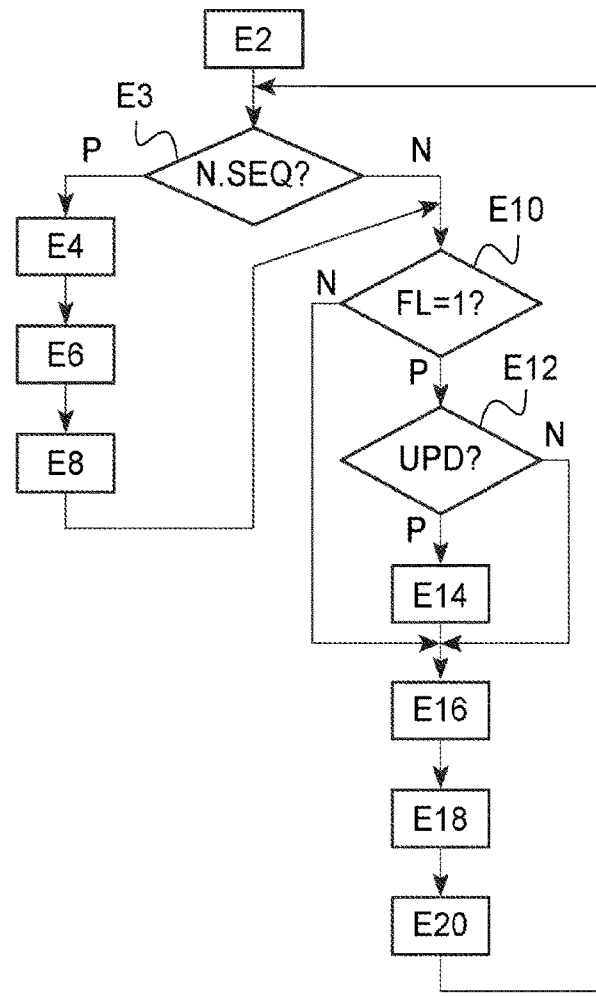
FIG. 3 is a flowchart showing an example of encoding method that can be implemented in the encoding device of FIG. 1.

FIG. 3 shows an example of encoding method, here implemented by the encoding device 2.

This encoding method applies to a temporal (and hence ordered) succession of images IMG. This temporal succession of images IMG thus forms a video that is to be encoded for transmission or storage (recording).

The method of FIG. 3 starts with an initialization step E2 in which the encoding device 2 selects the first image of the temporal succession of images as the current image.

The method of FIG. 3 continues with a step E3 in which the encoding device 2 (here the sequence management module 4) determines if the current image IMG is chosen as a first image of a sequence.

The criterion used to perform this determination can vary depending on the application targeted by the video coding.

In the example described herein (possibly usable for a data stream for television broadcasting), the encoding device 2 (here, the sequence management module 4) starts a new sequence every second. Therefore, the waiting time of the data stream part relating to a new sequence (that makes it possible to perform the image decoding) is 1 second maximum (this waiting time is necessary, for example in case of channel change).

As an alternative, it is possible to start a new sequence at a shot change in the video. Such a shot change can be determined automatically by analyzing the images of the temporal succession of images.

According to another alternative, it is possible to provide sequences of longer duration (for example, between 10 seconds and 40 seconds) in order to reduce the transmission rate (the encoding of each first image of a sequence requiring a larger amount of data, so as to be able to reconstruct this image based only on these data, without reference to data relating to other images).

If it is determined at step E3 that the current image IMG is chosen as the first image of a sequence (i.e. the encoding device 2 starts a new sequence), the method continues with step E4 described hereinafter.

If the current image IMG is not chosen as the first image of a sequence (i.e. the encoding device 2 continues the encoding of the current sequence), the method continues with step E10 described hereinafter for processing the current image IMG.

At step E4, the encoding device 2 (here, the network determination module 8) determines the encoding artificial neural network EN to be associated with the current sequence. The so-determined encoding artificial neural network EN becomes the current encoding artificial neural network.

According to a possible embodiment, the network determination module 8 choses the encoding artificial neural network EN among a predetermined set of encoding artificial neural networks, for example among a set of encoding artificial neural networks respectively associated with decoding artificial neural networks available within the decoding device (a preliminary exchange between the encoding device and the decoding device being possible in that case to identify this set of artificial neural networks).

According to a possible embodiment, the network determination module 8 choses the encoding artificial neural network EN that obtains the best compression performance, for example in terms of a rate-distortion criterion or a measurement of quality of the decoded two-dimensional representation IMG'. For that purpose, the network determination module 8 can for example apply the current image IMG (or a plurality of images including the current image IMG) at the input of several encoding artificial neural networks (each possibly in association with the decoding artificial neural network that is associated therewith) and chose the encoding artificial neural network EN that makes it possible to obtain the best compression performance, as indicated hereinabove.

In the example described herein, in which the sequence has a predetermined duration (for example, 1 second), the set of images of the sequence can be applied (successively) as an input of the different encoding artificial neural networks to choose the encoding artificial neural network EN that makes it possible to obtain the best compression performance.

As an alternative, the network determination module 8 can analyze the current image IMG (or a plurality of images including the current image IMG, here the images of the sequence), for example to identify the relevant type of content (sport, computer-generated imagery, film, videoconferencing, etc.), and choose an encoding artificial neural network EN as a function of the result of this analysis, for example as a function of the identified type of content.

According to another possible embodiment, the network determination module 8 can determine the encoding artificial neural network EN by means of a training process. Such a training process comprises, for example:

- applying the current image IMG (or a plurality of images including the current image IMG, here the images of the current sequence) as an input of the encoding artificial neural network EN;
- optimizing the encoding artificial neural network EN and the associated decoding artificial neural network DN (in particular, by changing the weights defining each of these two neural networks EN, DN), possibly by means of several iterations, in such a way as to reduce (or even minimize) the rate-distortion cost (this cost being for example a weighted sum of the rate produced by the data unit(s) DU, and the distortion between the decoded two-dimensional representation(s) IMG' and the image(s) IMG applied as an input).

The method continues with step E6, in which the encoding device 2 (here, the network determination module 4) determines if the encoding artificial neural network EN can be updated during the current sequence of images. If not, the encoding artificial neural network EN, determined at step E4, will be used to encode all the images of the current sequence.

In the embodiment described herein (in which the sequence has a predetermined duration, for example 1 second), the sequence management module 4 analyses the images of the sequence, and chooses to enable the updating of the encoding artificial neural network EN during the sequence of images when this analysis indicates inhomogeneity of the analyzed images, and not to provide an updating of the encoding artificial neural network EN during the sequence when this analysis indicates homogeneity of the analyzed images.

The analyzed images (i.e. the images of the relevant sequence) are for example determined as homogeneous if the mean quadratic error between the respective luminance components of the two successive images is lower than a predetermined threshold for all the successive pairs of images of the sequence. (By way of example, this threshold may be between 25 and 75, for example equal to 50, for images whose luminance values can vary between 0 and 255.)

According to a possible embodiment, it is conceivable to simulate the encoding and decoding of the images of the sequence with and without updating of the encoding artificial neural network during the sequence (the potential updating operations being performed as described below), to calculate a rate-distortion criterion in both cases, and to choose whether or not to enable the updating of the encoding artificial neural network EN (during the current sequence) according to the solution that minimizes the rate-distortion criterion.

According to another possible embodiment (conceivable when the temporal succession of images is previously divided into sequences, for example by analysis of all the images of the temporal succession), the choice to enable the updating of the encoding artificial neural network EN during the current sequence of images is made (by the sequence management module 4) depending on the duration of the current sequence. For example, if the duration of the current sequence is less than 2 seconds, the encoding device 2 (here the sequence management module 4) chooses not to provide an updating of the encoding artificial neural network EN during the sequence; otherwise, the encoding device 2 (here the sequence management module 4) chooses to enable an updating of the encoding artificial neural network EN during the current sequence.

The method then continues with step E8, in which the encoding device (here, the network determination module 4) produces a set of parameters SPS relating to the current sequence.

This set of parameters SPS includes the data NN indicative of the decoding artificial neural network DN associated with the encoding artificial neural network EN selected at step E4. As already indicated, these indicative data NN are here produced by the network determination module 8.

According to a possible embodiment, these indicative data NN can be an identifier Inn of the decoding artificial neural network DN among a predetermined set of artificial neural networks (the characteristics of the artificial neural networks of this predetermined set being for example stored within the decoding device or accessible, possibly by downloading, by the decoding device).

According to another possible embodiment, these indicative data NN can be an encoded representation Rc of the decoding artificial neural network DN, for example an encoded representation Rc of characteristic parameters (such as the structure and/or the weights) of the decoding artificial neural network DN.

The above-mentioned encoded representation Rc can for example be constructed in accordance with a standard such as MPEG-7 part 17 or with a format such as JSON.

Reference may be made for that purpose to the article "*DeepCABAC: Context-adaptive binary arithmetic coding for deep neural network compression*", by S. Wiedemann et al., in Proceedings of the 36th International Conference on Machine Learning, Long Beach, California, PMLR 97, 2019, or to the article "*Compact and Computationally Efficient Representation of Deep Neural Networks*", by S. Wiedemann et al., in IEEE Transactions on Neural Networks and Learning Systems (Vol. 31, Iss. 3), March 2020.

According to another possible embodiment, these indicative data NN can be differential encoding data Δ differentially encoding the decoding artificial neural network DN relatively to a reference decoding artificial neural network R.

In this context, it is conceivable that the decoding artificial neural network DN (associated with the encoding artificial neural network EN selected at step E4) and the reference decoding artificial neural network R have the same structure. The differential encoding data Δ can then contain in particular data respectively representative of differences between each weight of the decoding artificial neural network DN and the corresponding weight (i.e. located at the same place in the common structure) of the reference decoding artificial neural network R.

As an alternative, the differential encoding data Δ can be representative of a subset of weights of the reference decoding artificial neural network R to be updated. These differential encoding data Δ can indicate in this case which weights are to be updated and/or the value of each of the weights to be updated.

According to another alternative, the differential encoding data Δ can be representative of additional layers of artificial neural network to be inserted within the structure of the reference decoding artificial neural network R. The differential encoding data Δ describe for example in this case, for each additional layer, the structure of the additional layer concerned, the weights of the artificial neurons forming the additional layer concerned and/or the place of insertion of the additional layer concerned within the reference decoding artificial neural network R.

The set of parameters SPS can in this case further contain data indicative of the reference artificial neural network R, for example an identifier of the reference artificial neural network R among a predetermined set of artificial neural networks (set of the same type as mentioned hereinabove for the identifier Inn). As an alternative, as explained hereinafter as regards the decoding, the reference artificial neural network R is determined at this stage (without requiring complementary information): it may be for example the decoding artificial neural network associated with the encoding artificial neural network previously used during the different iterations of the encoding method of FIG. 3, or a predetermined decoding artificial neural network (used as a reference decoding artificial neural network for the whole decoding method).

The set of parameters SPS moreover comprises a flag FL signaling the possibility (or impossibility) of updating the decoding artificial neural network during the current sequence, i.e. the potential presence or the absence, within the data stream part corresponding to the sequence of current images, of data NN' indicative of another distinct decoding artificial neural network distinct from the current decoding artificial neural network DN. As will become clear from the following description, the flag FL signals in practice the presence or the absence of at least another flag FL', which indicates the (effective) presence or absence of the data NN' indicative of the other decoding artificial neural network distinct from the current decoding artificial neural network DN.

The encoding device 2 (here the sequence management module 4) sets the flag FL value as a function the result of step E6 of determining the possibility of updating the decoding artificial neural network during the current image sequence.

More precisely, when it is determined at step E6 that the updating of the decoding artificial neural network is possible during the current sequence of images, the flag FL value signals this update possibility, i.e. the potential presence, within the data stream part corresponding to the current sequence of images, of data NN' indicative of another decoding artificial neural network. As explained in the following, the flag FL value signals in this case the presence of at least another flag FL' signaling the presence or the absence of these indicative data NN'. In the example described herein, in this case, FL=1.

Conversely, when it is determined at step E6 that the updating of the decoding artificial neural network is impossible during the current sequence of images, the value of the flag FL signals this impossibility, i.e. the absence, within the data stream part corresponding to the current sequence of images, of data indicative of another decoding artificial neural network. Here, the value of the flag FL signals the absence (within the current sequence) of another flag signaling the presence of data indicative of another decoding artificial neural network. In the example described herein, in this case, FL=0.

The set of parameters SPS can further contain data indicating the format of the chrominance images (or components) in the current sequence, and/or data indicating the maximum size of the images of the current sequence, and/or data indicating the minimum size of image blocks of the current sequence.

The set of parameters SPS is inscribed in the data stream S to be emitted (here by means of the stream forming module 12), for example in the header of the data stream part associated with the current sequence of images.

The method then continues with step E10 for processing the current image IMG.

The encoding device 2 (here the image management module 6) determines at step E10 if the flag FL indicates the possibility to update the encoding artificial neural network EN within the current sequence of images (i.e. here the flag FL value is equal to 1).

If so, at step E10 (arrow P), the method continues with step E12 described hereinafter. If not, at step E10 (arrow N), the method continues with step E16 described hereinafter.

The decoding device 2 (here the image management module 6) determines at step E12 if the encoding artificial neural network has to be updated for the encoding of the current image IMG or if the current image encoding can be made with the current encoding artificial neural network.

The determination of step E12 can be made by analysis of the current image IMG.

According to another possible embodiment, the determination of step E12 can be made by simulating the encoding of the current image IMG by means of the current encoding artificial neural network and the encoding of the current image IMG by means of one (or several) other encoding artificial neural network(s), and by choosing to update the encoding artificial neural network if the results obtained (according to a rate-distortion criterion) are better with at least one of these other encoding artificial neural networks.

If it is determined at step E12 that an updating of the encoding artificial neural network is contemplated for the current image IMG, the encoding device (here the image management module 6) sets a flag FL' at a value indicating this update (here FL'=1 in this case) and the method continues with step E14.

On the other hand, if it is determined at step E12 that the current encoding artificial neural network is used (without being updated) for encoding the current image IMG, the encoding device (here the image management module 6) sets a flag FL' at a value indicating this absence of update (here FL'=0 in this case) and the method continues with step E16.

At step E14, the decoding device 2 (here, the network determination module 8) determines the encoding artificial neural network to be used for encoding the current image IMG. The so-determined encoding artificial neural network becomes the current encoding artificial neural network.

When step E12 comprises simulating the current image IMG encoding with at least one other artificial neural network and that this other artificial neural network makes it possible to obtain the best result according to a rate-distortion criterion, this other artificial neural network can be chosen at step E14 as the encoding artificial neural network to be used for the encoding of the current image IMG.

As already indicated at step E4, the network determination module 8 can choose the encoding artificial neural network to be used for the current image IMG among a predetermined set of encoding artificial neural networks, for example among a set of encoding artificial neural networks respectively associated with decoding artificial neural networks available within the decoding device.

The network determination module 8 can also choose the encoding artificial neural network that obtains the best compression performance, for example in terms of a rate-distortion criterion or a measurement of quality of the decoded two-dimensional representation IMG' (possibly independently of step E12). For that purpose, the network determination module 8 can for example apply the current image IMG at the input of several encoding artificial neural networks (each possibly in association with the decoding artificial neural network that is associated therewith) and choose the encoding artificial neural network that makes it possible to obtain the best compression performance, as indicated hereinabove.

According to another possible embodiment, the network determination module 8 can analyze the current image IMG, for example to identify the relevant type of content, and choose an encoding artificial neural network as a function of the result of this analysis, for example as a function of the type of content identified.

According to another possible embodiment, the network determination module 8 can determine the encoding artificial neural network to be used to encode the current image IMG by means of a training process. Such a training process comprises, for example:
  applying the current image IMG as an input of the encoding artificial neural network;
  optimizing the encoding artificial neural network and the associated decoding artificial neural network (in particular, by changing the weights defining each of these two neural networks), possibly by means of several iterations, in such a way as to reduce (or even minimize) the rate-distortion cost (this cost being for example a weighted sum of the rate produced by the data unit DU associated with the current image IMG, and the distortion between the decoded two-dimensional representation IMG' and the input current image IMG).

The method then continues with step E16, in which the encoding device (here, the image management module 6) produces a set of parameters PPS relating to the current image IMG.

This set of parameters PPS relating to the current image IMG can comprise (here, when the flag FL relating to the current sequence is equal to 1) the flag FL' indicating the updating or the absence of updating of the encoding artificial neural network for the encoding of the current image IMG. This flag FL' thus also indicates the presence or the absence, within the set of parameters PPS relating to the current image IMG, of data indicative of a decoding artificial neural network (associated with the updated encoding artificial neural network).

When the flag FL' indicates an updating of the encoding artificial neural network (and hence the presence of data indicative of a decoding artificial neural network), the set of parameters PPS relating to the current image IMG further comprises these data NN' indicative of the decoding artificial neural network. These data NN' are here provided by the network determination module 8 (following the implementation of step E14).

According to a possible embodiment, these indicative data NN' can be an identifier Inn of the decoding artificial neural network among a predetermined set of artificial neural networks (the characteristics of the artificial neural networks of this predetermined set being for example stored within the decoding device or accessible, possibly by downloading, by the decoding device).

According to another possible embodiment, these indicative data NN' can be an encoded representation Rc of the decoding artificial neural network, for example an encoded representation Rc of characteristic parameters (such as the structure and/or the weights) of the decoding artificial neural network.

Reference can be made to the explanations given hereinabove with reference to step E8 on this subject.

According to another possible embodiment, these indicative data NN' can be differential encoding data Δ' differentially encoding the decoding artificial neural network relatively to a reference decoding artificial neural network. The possibilities relating to the differential encoding and presented hereinabove with reference to step E8 also apply here.

In particular, the reference decoding artificial neural network can be designated by indicative data contained in the set of parameters SPS relating to the current sequence (set SPS produced during the previous passage through step E8).

The set of parameters PPS relating to the current image IMG may contain other parameters, such as the size of the image.

The set of parameters PPS is inscribed in the data stream S to be emitted (here by means of the stream forming module 12), for example in the header relating to the current image IMG.

The encoding device 2 (here the encoding module 10) then proceeds to step E18 of encoding the current image IMG by means of the current encoding artificial neural network, which outputs a data unit DU associated with the current image IMG. This data unit DU can thus be recorded in the data stream S (here by the stream forming module 12).

The encoding device 2 then selects the following image in the temporal succession of images as the new current image (step E20) and loops to step E3 for processing this new current image.

Figure 4:
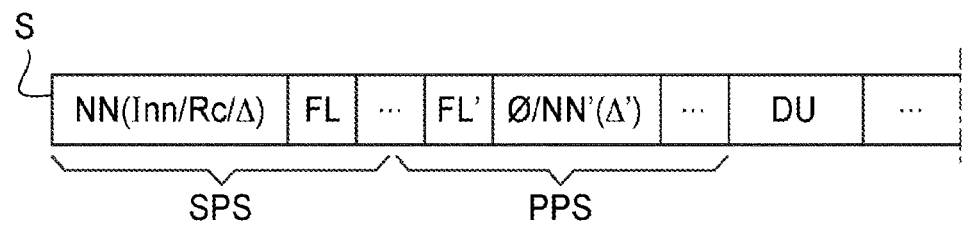
FIG. 4 shows a data stream produced by the encoding method of FIG. 3.

FIG. 4 shows the data stream S obtained by the just described encoding method.

This data stream S comprises for each sequence of images:
  a header relating to the relevant sequence of images, this header comprising a set of parameters SPS relating to the concerned sequence of images; and, for each image of the relevant sequence of images:
  a header relating to the image concerned, this header comprising a set of parameters PPS relating to the image concerned;
  a data unit (comprising the encoded data) relating to the relevant image.

The set of parameters SPS relating to a sequence of images comprises:
  data NN indicative of a decoding artificial neural network associated with this sequence of images;
  a flag FL indicating the potential presence or the absence, within the data stream part associated with this sequence of images, of data indicative of another decoding artificial neural network, distinct from the decoding artificial neural network associated with this sequence of image.

In the example described herein, this flag FL thus signals the presence or the absence, within each set of parameters PPS relating to an image of the relevant sequence of images, of a (other) flag FL' signaling the presence or the absence of data indicative of a decoding artificial neural network to be used for decoding the image concerned.

The set of parameters PPS relating to an image comprises:
  when the flag FL indicates the possibility of updating the decoding artificial neural network within the current sequence, a flag FL' indicating the presence or the absence (here within this same set of parameters PPS relating to the relevant image) of data indicative of a decoding artificial neural network (distinct from the decoding artificial neural network associated with the sequence of images comprising the image concerned);
  in the case where the flag FL' indicates the presence of such data indicative of a decoding artificial neural network, these indicative data NN' themselves (in order to allow the decoding of the data unit relating to the image concerned by this decoding artificial neural network).

As already indicated, the above-mentioned indicative data NN, NN' can be an identifier of the decoding artificial neural network among a predetermined set of artificial neural networks, or an encoded representation of the decoding artificial neural network, or also differential encoding data differentially encoding the decoding artificial neural network relatively to a reference decoding artificial neural network.

It may be provided, for example, that the data NN indicative of the decoding artificial neural network associated with a sequence of images (contained in the set of parameters SPS relating to this sequence of images) are data indicative of a reference decoding artificial neural network and/or that the data NN' indicative of the decoding artificial neural network associated with an image (contained in the set of parameters PPS relating to an image) are differential encoding data relatively to this reference decoding artificial neural network (defined by the data NN contained in the set of parameters SPS relating to the sequence of images comprising this image).

FIG. 5 shows the main functional elements of a decoding device 20.

This decoding device 20 comprises a decoding module 22, a network determination module 24, a storage unit 26, a configuration module 28, a processing module 25 and an analysis unit 30.

The encoding device 20 can in practice be implemented by means of an electronic device comprising a processor and a memory; each of the modules 22, 24, 25, 28, 30 mentioned hereinabove can then be made by the cooperation of the processor and computer program instructions stored in the above-mentioned memory and designed to perform the functions of the relevant module, in particular as described hereinafter, when these instructions are executed by the processor. The storage unit 26 can correspond to the above-mentioned memory.

The decoding device 20 receives a data stream as an input, here the data stream S produced by the encoding device 2 (as explained hereinabove) and represented in FIG. 4. The data stream S comprises several parts each comprising a plurality of data units DU respectively associated with the different images of a sequence of images. (In other words, each of these parts of the data stream corresponds to a sequence of images.)

The analysis unit 30 is designed to analyze the data stream S in such a way as to identify in this data stream S the different data it is consisted of, as schematically shown in FIG. 4. The analysis unit 30 can in practice perform an entropic decoding of the data stream S to obtain these data. However, as already indicated, this aspect will not be described in detail herein.

The analysis unit 30 comprises in particular a detection module 32 designed to detect a flag FL as described hereinabove in the current part of the data stream S (i.e. in the part of the data stream S relating to the current sequence). As indicated hereinabove, such a flag FL signals the possibility or impossibility to update the decoding artificial neural network within the current sequence, and hence the potential presence or absence, here in the current part of the data stream, of data NN' indicative of a decoding artificial neural network, distinct from the decoding artificial neural network associated with the current sequence (and used for example for decoding the data unit associated with the first image of the current sequence). As already indicated, the flag FL here signals the presence or the absence (in the current part of the data stream) of at least another flag FL' itself signaling the presence or the absence of these data NN' (such another flag FL' being located in each set of parameters PPS relating to an image, for any image of the current sequence, when the flag FL signals the presence of at least such another flag, in the example described here).

The analysis unit 30 also comprises a reading module 33 designed to read this other flag FL' in the data stream when the flag FL (relating to the current sequence) signals the presence of at least such another flag, i.e. the potential presence of data NN'.

The analysis unit 30 also comprises an obtaining module 34 designed to obtain these indicative data NN' by analyzing the data stream S (precisely, of the current part of the data stream, associated with the current sequence of images) when the other flag FL' signals the presence of such indicative data NN'.

The analysis unit 30 is moreover designed to identify the data units DU within the data stream S and to transmit each data unit DU to the decoding module 22 for decoding this data unit DU, as described hereinafter.

The network determination module 24 is designed to determine the decoding artificial neural network DN to be used for decoding the current data unit DU as a function of a least one data item of the set of parameters SPS relating to the current sequence and/or at least one data item of the set of parameters PPS relating to the current image.

According to a possible embodiment, the network determination module 24 can determine the decoding artificial neural network DN by decoding differential encoding data Δ differentially encoding the decoding artificial neural network DN relatively to a reference decoding artificial neural network R (these differential encoding data Δ being contained in the set of parameters SPS relating to the current sequence or in the set of parameters PPS relating to the current image, as described hereinafter).

This method for determining the decoding artificial neural network DN using encoded data in the stream S allows a rapid and efficient determination of the decoding artificial neural network DN. Indeed, that way, it is not necessary to search for the optimum decoding artificial neural network.

As already indicated, the decoding artificial neural network DN and the reference decoding artificial neural network R can have the same structure and the differential encoding data Δ can then contain in particular data respectively representative of differences between each weight of the decoding artificial neural network DN and the corresponding weight (i.e. located at the same place in the common structure) of the reference decoding artificial neural network R.

As an alternative, the data indicative of the decoding artificial neural network DN to be used (data contained in the set SPS or PPS) is an identifier Inn of the decoding artificial neural network DN among a predetermined set of decoding artificial neural networks. The network determination module 24 determines in this case the decoding artificial neural network DN to be used for decoding the current data unit DU based on this identifier Inn.

According to still another alternative, the set of parameters SPS relating to the current sequence (or, as the case may be, the set of parameters PPS relating to the current image) contains an encoded representation Rc of the decoding artificial neural network DN. The network determination module 24 determines in this case the decoding artificial neural network DN by decoding this encoded representation Rc.

The storage unit 26 can store data C characteristic of each artificial neural network of the predetermined set of artificial neural networks and/or data characteristic of at least one reference decoding artificial neural network R. These characteristic data can include in particular the weights of the artificial neural network concerned.

The processing module 25 is on its side designed to process data descriptive of the reference decoding artificial neural network included in the data stream S. These descriptive data are for example an encoded representation of the reference decoding artificial neural network, for example constructed in accordance with a standard such as MPEG-7 part 17 or with a format such as JSON (as explained hereinabove as regards the encoded representation Rc).

The configuration module 28 is designed to configure the decoding module 22 in such a way that this decoding module 22 can decode the current data unit DU by means of the decoding artificial neural network DN determined by the network determination module 24.

The decoding module 22 can thus produce a two-dimensional representation of the image associated with the current data unit DU by decoding this current data unit DU and possibly at least another data unit included in the current part of the data stream (i.e. associated with the current sequence of images).

The configuration module 28 is for example designed to instantiate the decoding artificial neural network DN (determined by the network determination module 24) within the decoding module 22.

This instantiation may comprise in particular the following steps:
- reserving, within the decoding unit 22, the memory space required for implementing decoding artificial neural network DN; and/or
- programming the decoding unit 22 with the characteristics (in particular the weights) of the decoding artificial neural network DN; and/or
- loading part at least of the data unit DU to be decoded in a local memory of the decoding module 22.

In practice, the decoding module 22 can be a parallel processing unit, for example a Graphical Processing Unit or GPU, or a Tensor Processing Unit or TPU.

FIG. 6 shows an example of decoding method, here implemented by the decoding device of FIG. 5. This decoding method is for example implemented due to the execution, by a processor of the decoding device 20, of the instructions of a computer program stored in a memory of the decoding device 20 (for example, in the storage unit 26).

It is considered here that the decoding device 20 receives as an input the data stream S produced by the method of FIG. 3 and shown in FIG. 4.

This method starts at step E22 in which the decoding device 20 selects the first image to be decoded shown in the data stream S as the current image.

The method continues with step E24, in which the decoding device 20 (here, the analysis unit 30) tests if a header relating to a video sequence (containing a set of parameters SPS relating to this video sequence) is present in the data stream S received (precisely, in the part of the data stream S that is being processed by the decoding device 20). This may be made in practice by the detection of characteristic information of a header relating to a sequence of images (for example, in the signaling of the data stream S).

If so, the method continues with step E26 for decoding this header (i.e. consulting data from the above-mentioned set SPS).

If not, the method continues with step E28 described hereinafter.

When a header relating to a sequence of images is detected (here, by the analysis unit 30), at step E26, the decoding device 20 (here, the analysis unit 30) extracts from the data stream S the set of parameters SPS relating to the current sequence, that here contains in particular:
- data NN indicative of a decoding artificial neural network DN (associated with the current sequence of images);
- a flag FL signaling the presence (or the absence), here in the data stream part associated with the current sequence of images, of another flag FL' signaling the presence (or the absence) of data indicative of another decoding artificial neural network, distinct from the decoding artificial neural network DN indicated by the data NN (this flag FL thus signaling the potential presence or the absence of these data indicative of this other decoding artificial neural network).

The data stream part associated with the current sequence of images here comprises the set of parameters SPS relating to the current sequence and the data (sets of parameters PPS relating to images, data units DU relating to images) encountered until a new header relating to a (new) sequence of images is detected.

The flag FL thus indicates the possibility or impossibility of updating, during the current sequence of images, the decoding artificial neural network used for decoding the images (i.e., in practice, the data units) of this current sequence.

According to a possible embodiment, the indicative data NN can be an identifier Inn of the decoding artificial neural network DN among a predetermined set of artificial neural networks. The characteristics C of each of the artificial neural networks of this predetermined set are for example in this case stored within the decoding device 20 (here, in the storage unit 26). As an alternative, these characteristics could be accessible, possibly by downloading, by the decoding device 20.

According to another possible embodiment, these indicative data NN can be an encoded representation Rc of the decoding artificial neural network DN, for example an encoded representation Rc of characteristic parameters (such as the structure and/or the weights) of the decoding artificial neural network DN.

The above-mentioned encoded representation Rc can for example be constructed in accordance with a standard such as MPEG-7 part 17 or with a format such as JSON.

According to another possible embodiment, these indicative data NN can be differential encoding data Δ differentially encoding the decoding artificial neural network DN relatively to a reference decoding artificial neural network R.

The set of parameters SPS extracted at step E26 can in this case further contain data indicative of the reference artificial neural network R, for example an identifier of the reference artificial neural network R among a predetermined set of artificial neural networks (set of the same type as mentioned hereinabove for the identifier Inn).

As an alternative, the reference artificial neural network R is determined at this stage (without requiring any complementary information in the set SPS): it may be for example a predetermined decoding artificial neural network (used as a reference decoding artificial neural network for any decoding performed by the decoding device 20) or the reference decoding artificial neural network previously used (during previous iterations of the method of FIG. 6).

As already indicated, the decoding artificial neural network DN (encoded by the differential encoding data Δ) and the reference decoding artificial neural network R can have the same structure. The differential encoding data Δ can then contain in particular data respectively representative of differences between each weight of the decoding artificial neural network DN and the corresponding weight (i.e. located at the same place in the common structure) of the reference decoding artificial neural network R.

According to an alternative already mentioned, the differential encoding data Δ can be representative of a subset of weights of the reference decoding artificial neural network R to be updated. These differential encoding data Δ can indicate in this case which weights are to be updated and/or the value of each of the weights to be updated.

According to another alternative also mentioned hereinabove, the differential encoding data Δ can be representative of additional artificial neural network layers to be inserted within the structure of the reference decoding artificial neural network R. The differential encoding data Δ describe for example in this case, for each additional layer, the structure of the additional layer concerned, the weights of the artificial neurons forming the additional layer concerned and/or the place of insertion of the additional layer concerned within the reference decoding artificial neural network R.

In the different cases, the decoding device 20 (here, the network determination module 24) determines the decoding artificial neural network DN associated with the current sequence of images based on the indicative data NN. This decoding artificial neural network DN becomes the current encoding artificial neural network.

The configuration module 28 can then configure the decoding module 22 in such a way that this decoding module 22 is adapted to decode one (or several) data unit(s) (to be extracted from the data stream S as explained hereinafter) by means of this current decoding artificial neural network.

The method continues with step E28 in which the decoding device 20 (here, the analysis unit 30) detects a header relating to an image in the data stream S and extracts therefrom a set of parameters PPS relating to this image. This may be made in practice by the detection of characteristic information of a header relating to an image (for example, in the signaling of the data stream S).

The decoding device 20 (here, the analysis unit 30) determines at step E30 if the flag FL (contained in the set of parameters SPS relating to the current sequence and extracted at step E26) indicates the potential presence or the absence of data indicative of another decoding artificial neural network, i.e. here, in practice, the presence or the absence of another flag FL' as mentioned hereinafter.

If the flag FL indicates the absence of data indicative of another decoding artificial neural network (here within the current part of the data stream S, i.e. for the current sequence of images), i.e. if FL=0 in the example described, the decoding method continues with step E42 described hereinafter for decoding the current image.

If the flag FL indicates the potential presence of such indicative data (case in which FL=1 in the example described), i.e. here the presence of the other flag FL', the decoding method continues with step E32 in which the decoding device 20 (here, the reading module 33) reads this other flag FL', here within the set PPS extracted at step E28.

This other flag FL' indicates, as already explained, the presence or the absence (here, within the set of parameters PPS relating to the current image) of data NN' indicative of a decoding artificial neural network (distinct from the current decoding artificial neural network and/or the determined decoding artificial neural network, during the last passage through step E26, based on the indicative data NN contained in the set SPS and/or the determined decoding artificial neural network, during a previous passage through step E36 described hereinafter, based on indicative data NN' contained in a previous set PPS).

The method of FIG. 6 then continues with a step E34 in which the decoding device 20 (here, the analysis unit 30) determines if the other flag FL' (read at step E32) indicates the presence (here when FL'=1) or the absence (here, when FL'=0) of the data NN' indicative of a distinct artificial neural network. In other words, the decoding device 20 here determines if the decoding artificial neural network has to be updated (here when FL'=1) or not (here when FL'=0) to decode the current image (associated with the current set PPS).

If the other flag FL' indicates the absence of data NN' (case in which FL'=0), the method continues with step E42 described hereinafter for decoding the current image.

If the other flag FL' indicates the presence of data NN' (case in which FL'=1), the method continues with step E36 in which the decoding device 20 (here the obtaining module 34) obtains the data NN' indicative of the distinct decoding artificial neural network by analysis of the data stream S, here by consulting the set of parameters PPS relating to the current image (extracted from the data stream S at step E28).

As already indicated, the indicative data NN' can be differential encoding data Δ' differentially encoding the distinct decoding artificial neural network, relatively to a reference decoding artificial neural network.

According to a possible embodiment, the reference decoding artificial neural network can be the decoding artificial neural network associated with the current sequence (determined at step E26 based on the indicative data NN contained in the set of parameters SPS relating to the current sequence).

According to another possible embodiment, this reference decoding artificial neural network can be the current decoding artificial neural network (determined during the passage through step E26 or during a previous passage through step E38 described hereinafter).

According to still another possible embodiment, the reference decoding artificial neural network can be, as already indicated, a predetermined artificial neural network (for example, fixed for the relevant decoding device).

As already explained, the distinct decoding artificial neural network, encoded by the differential encoding data Δ', and the reference decoding artificial neural network can have the same structure. The differential encoding data Δ' can then contain in particular data respectively representative of differences between each weight of the distinct decoding artificial neural network and the corresponding weight (i.e. located at the same place in the common structure) of the reference decoding artificial neural network.

According to the already indicated alternative, the differential encoding data Δ can be representative of a subset of weights of the reference decoding artificial neural network R to be updated. These differential encoding data Δ can indicate in this case which weights are to be updated and/or the value of each of the weights to be updated.

According to another alternative already considered, the differential encoding data Δ can be representative of additional artificial neural network layers to be inserted within the structure of the reference decoding artificial neural network R. The differential encoding data Δ describe for example in this case, for each additional layer, the structure of the additional layer concerned, the weights of the artificial neurons forming the additional layer concerned and/or the place of insertion of the additional layer concerned within the reference decoding artificial neural network R.

As an alternative, the indicative data can be an identifier of the distinct decoding artificial neural network among a predetermined set of artificial neural networks (the characteristics C of which are stored in the storage unit 26), or an encoded representation of the distinct decoding artificial neural network, for example an encoded representation of characteristic parameters (such as the structure and/or the weights) of the distinct decoding artificial neural network.

The method of FIG. 6 then continues with a step E38 in which the decoding device 20 (here, the network determination module 24) determines the distinct decoding artificial neural network, to be used for decoding the current image, based on the indicative data NN'. This distinct decoding artificial neural network then becomes the current decoding artificial neural network.

The decoding device 20 (here, the configuration module 28) can thus configure, at step E40, the decoding module 22 in such a way that this decoding module 22 is adapted to decode (as described hereinafter) the data unit DU relating to the current image by means of the decoding artificial neural network determined at step E38.

The method of FIG. 6 continues with step E42, in which the decoding device 20 (here, the analysis unit 30) extracts the data unit DU relating to the current image of the data stream S and the decoding module 22 performs the decoding of this data unit DU by means of the current decoding artificial neural network, which makes it possible to obtain a two-dimensional representation IMG' of the current image.

According to a possibility, the just-mentioned decoding further uses at least another data unit included in the current part of the data stream, i.e. relating to another image of the current sequence of images.

The method of FIG. 6 then loops to step E24 for analyzing the following of the data stream S and processing the following image.

The invention claimed is:

1. A decoding method for decoding a part of a data stream, said data stream part comprising a plurality of data units respectively associated with a plurality of images and representative together of the different images of the plurality of images, said data stream part further comprising differential encoding data differentially encoding a decoding artificial neural network relatively to a reference decoding artificial neural network, the decoding method being performed by an electronic device and comprising:
   determining the decoding artificial neural network by decoding said differential encoding data; and
   decoding at least one of the plurality of data units by means of the determined decoding artificial neural network.

2. The decoding method according to claim 1, wherein data characteristic of the reference decoding artificial neural network are stored in a memory of the electronic device.

3. The decoding method according to claim 2, wherein the data stream comprises an identifier of the reference decoding artificial neural network.

4. The decoding method according to claim 1, wherein the data stream comprises descriptive data of the reference decoding artificial neural network.

5. The decoding method according to claim 4, wherein said descriptive data are included in said data stream part.

6. The decoding method according to claim 1, wherein said decoding said data unit produces a two-dimensional representation of the image associated with said data unit by decoding said data unit and at least another said data unit included in said data stream part.

7. The decoding method according to claim 1, wherein the reference decoding artificial neural network is defined by a plurality of first weights, wherein the determined decoding artificial neural network is defined by a plurality of second weights and wherein said differential encoding data comprise data each representing a difference between a given one of the plurality of first weights and a corresponding one of the plurality of second weights.

8. The decoding method according to claim 1, wherein data indicative of the reference artificial neural network are contained in a set of parameters relating to said part of the data stream and wherein the differential encoding data are contained in a set of parameters relating to the image associated with said data unit.

9. The decoding method according to claim 1, wherein the data stream comprises at least one flag signaling presence, in part at least of the data stream, of at least another flag signaling presence of data indicative of another decoding artificial neural network, distinct from the determined decoding artificial neural network.

10. The decoding method according to claim 1, wherein the data stream comprises at least one flag signaling presence of said differential encoding data in said data stream part.

11. A decoding device comprising:
   at least one processor; and
   at least one non-transitory computer readable medium comprising instructions stored thereon which when executed by the at least one processor configure the decoding device to decode a part of a data stream, said part of the data stream comprising a plurality of data units respectively associated with a plurality of images and representative together of the different images of the plurality of images, said part of the data stream further comprising differential encoding data differentially encoding a decoding artificial neural network relatively to a reference decoding artificial neural network, the decoding:
   determining the decoding artificial neural network by decoding said differential encoding data; and
   decoding at least one of the plurality of data units by means of the decoding artificial neural network determined by the determination module.

12. The decoding device according to claim 11, wherein the instructions configure the decoding device to store a data characteristic of the reference decoding artificial neural network.

13. The decoding device according to claim 11, wherein the instructions configure the decoding device to process data descriptive of the reference decoding artificial neural network included in the data stream.

14. The decoding device according to claim 11, wherein the instructions configure the decoding device to produce a two-dimensional representation of one of the plurality of images associated with said data unit by decoding said data unit and at least another one of the plurality of data units included in said data stream part.

15. A non-transitory computer-readable medium on which is stored a computer program comprising instructions executable by a processor and adapted to implement the decoding method according to claim 1 when the instructions are executed by the processor.

16. A method implemented by an encoding device and comprising:
   generating at least one part of a data stream comprising a plurality of data units respectively associated with a plurality of images and representative together of the different images of the plurality of images, said at least one part further comprising differential encoding data differentially encoding a decoding artificial neural network relatively to a reference decoding artificial neural network, wherein at least one data unit of the plurality of data units can be decoded using the decoding artificial neural network encoded by said differential encoding data, and
   storing and/or transmitting said data stream.

17. The decoding method according to claim 1, wherein the differential encoding data includes:
   data respectively representative of differences between each weight of the decoding artificial neural network and a corresponding weight of the reference decoding artificial neural network, or
   data representative of a subset of weights of the reference decoding artificial neural network, or
   data representative of additional layers of artificial neural network to be inserted within the structure of the reference decoding artificial neural network.

\* \* \* \* \*